UNITED STATES PATENT OFFICE.

ALBERT HENNING, OF LEYTONSTONE, LONDON, ENGLAND.

AGENT FOR REFRIGERATION PLANTS.

1,356,765.   Specification of Letters Patent.   Patented Oct. 26, 1920.

No Drawing.   Application filed October 31, 1919. Serial No. 334,890.

*To all whom it may concern:*

Be it known that I, ALBERT HENNING, a citizen of the United Kingdom of Great Britain and Ireland, and resident of 120 Harrow road, Leytonstone, London, E. 11, England, have invented certain new and useful Improvements Relating to Agents for Refrigeration Plants, of which the following is a specification, such as will enable others skilled in the art to which it appertains to make and use the same.

The invention relates to agents for use in refrigerating apparatus and to processes of manufacturing same.

The invention is particularly applicable to refrigerating machinery in which readily condensable vapors or fluids are used.

In the past ethyl chlorid and methyl chlorid have been used separately in such machines for refrigeration, but I have found it advantageous to use a mixture of methyl and ethyl chlorid for reasons set out hereinafter, and also, because by means of the processes hereinafter described, I can produce these conveniently and cheaply.

In the application of pure methyl chlorid to refrigeration machines, the pressures are comparatively high so as to render them unsuitable for certain purposes, for example in small plats where skilled attention is not available. In the case of machines using pure ethyl chlorid owing to the necessity of using vacuum there is a tendency for air to leak into the system from the atmosphere, which hinders the efficient operation of the machine.

By the use of a mixture of methyl chlorid and ethyl chlorid according to this invention, these defects can be largely overcome. The main advantage resulting from my invention relates however to the economy obtained in the production of the refrigerating agent.

According to this invention, the mixture of methyl and ethyl chlorid for use in refrigerating machines is obtained from a mixture of methyl and ethyl alcohols by the action of hydrochloric acid or some mixture of substances capable of generating this compound, for example sodium chlorid and sulfuric acid. The alcohols may be comparatively impure and other substances, for example, water, hydrocarbons, or catalysts such as zinc chlorid, sodium sulfate, or other known catalysts and the like may be present.

Owing to the difference in boiling point between methyl and ethyl chlorids, and the impurities commonly occurring in methyl and ethyl alcohols, there is in general, no necessity to use pure alcohols in the manufacture according to this invention.

When I desire to prepare a mixture of a different composition from that obtained by the direct transformation of the alcoholic mixture, I may, according to my invention, by redistillation or fractional condensation obtain a mixture of different composition. Thus for example, if I had prepared from a mixture of methyl and ethyl alcohols in any proportion a mixture containing ethyl chlorid and methyl chlorid, I could apply this mixture directly in refrigerating machinery or if I desired a mixture of different composition I re-distil this product and so obtain other mixtures having different proportions of ethyl chlorid and of methyl chlorid, or I may separate a pure ethyl chlorid and a mixture containing a larger proportion of methyl chlorid than the original product.

By the hereinbefore mentioned processes, I can produce mixtures of methyl and ethyl chlorids of any desired composition for application in refrigerating machinery.

The following example gives a method of producing the mixture according to the invention, but I do not confine myself to the details given in this example, and the conditions may be varied without departing from the spirit of the invention.

Example 1.

To produce a mixture of ethyl chlorid and methyl chlorid containing approximately 96% ethyl chlorid and 4% methyl chlorid, I proceed as follows:—

I take 100 parts by weight of a mixture of ethyl alcohol and methyl alcohol containing approximately 95% ethyl alcohol and 5% methyl alcohol, or a quantity of a mixture of these within different substances substantially as described in the specification containing the same quantities and proportions of these alcohols, and mix therewith 5 parts of zinc chlorid dissolved in the smallest proportion of water. The mixture I then saturate with hydrochloric acid gas by bubbling this gas through until no further absorption takes place—the mixture so obtained is distilled. If the operation is properly conducted at least 100 parts of a mixture of ethyl and methyl chlorids will be obtained from the distillate after suitable purification, containing approximately 96% ethyl chlorid and 4% methyl chlorid.

*Example 2.*

In order to obtain a mixture containing a larger proportion of methyl chlorid I may take the product prepared as above and redistil. The vapors first passing over contain a greater proportion of methyl chlorid, and by stopping at a certain stage easily ascertained by simple known tests, I can obtain a quantity of a mixture of any desired composition.

What I claim and desire to secure by Letters Patent is:—

An improved agent for use in refrigerating machines consisting of a mixture of methyl chlorid and ethyl chlorid.

In witness whereof I have hereunto set my hand in presence of two witnesses.

ALBERT HENNING.

Witnesses:
  HENRY FAIRBROTHER,
  ELIZABETH PARRY.